US008328920B2

(12) United States Patent
Sisk et al.

(10) Patent No.: US 8,328,920 B2
(45) Date of Patent: *Dec. 11, 2012

(54) INKJET INK HAVING IMPROVED HIGH RESOLUTION NOZZLE PLATE COMPATIBILITY

(75) Inventors: Meagan Winkler Sisk, Lexington, KY (US); Agnes Kam Zimmer, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 568 days.

This patent is subject to a terminal disclaimer.

(21) Appl. No.: 12/503,149

(22) Filed: Jul. 15, 2009

(65) Prior Publication Data

US 2011/0014376 A1   Jan. 20, 2011

(51) Int. Cl.
*C09D 11/02* (2006.01)
*B05D 5/00* (2006.01)
*B41J 2/01* (2006.01)

(52) U.S. Cl. ............... 106/31.27; 106/31.58; 106/31.59; 106/31.43; 427/256; 347/100

(58) Field of Classification Search .............. 106/31.27, 106/31.58, 31.59, 31.43; 427/256; 347/100
See application file for complete search history.

(56) References Cited

U.S. PATENT DOCUMENTS

| 5,254,160 | A |   | 10/1993 | Beach et al. |   |
|---|---|---|---|---|---|
| 5,364,461 | A |   | 11/1994 | Beach et al. |   |
| 5,560,766 | A | * | 10/1996 | Gundlach | 106/31.27 |
| 5,719,204 | A |   | 2/1998 | Beach et al. |   |
| 5,772,742 | A | * | 6/1998 | Wang | 106/31.27 |
| 5,891,231 | A |   | 4/1999 | Gnerlich et al. |   |
| 5,981,623 | A |   | 11/1999 | McCain et al. |   |
| 5,994,427 | A |   | 11/1999 | Kappele et al. |   |
| 6,063,834 | A |   | 5/2000 | Kappele et al. |   |
| 6,267,807 | B1 |   | 7/2001 | Harshbarger et al. |   |
| 6,540,821 | B2 | * | 4/2003 | Adamic et al. | 106/31.48 |
| 6,648,952 | B1 |   | 11/2003 | Matsumoto et al. |   |
| 6,652,634 | B1 |   | 11/2003 | Akers, Jr. et al. |   |
| 6,843,838 | B2 |   | 1/2005 | Zimmer et al. |   |
| 6,867,286 | B1 | * | 3/2005 | Holloway et al. | 106/31.48 |
| 6,896,724 | B2 |   | 5/2005 | Sun et al. |   |
| 6,984,701 | B2 |   | 1/2006 | Sacoto et al. |   |
| 7,034,149 | B2 |   | 4/2006 | Hirokazu et al. |   |
| 7,040,746 | B2 | * | 5/2006 | McCain et al. | 106/31.27 |
| 7,056,374 | B2 |   | 6/2006 | Kitayama et al. |   |
| 2004/0102541 | A1 |   | 5/2004 | Sacoto et al. |   |
| 2004/0127619 | A1 |   | 7/2004 | Sun et al. |   |
| 2009/0068417 | A1 |   | 3/2009 | Saito et al. |   |
| 2011/0012968 | A1 | * | 1/2011 | Holloway et al. | 347/100 |
| 2011/0014374 | A1 | * | 1/2011 | Holloway et al. | 106/31.27 |
| 2011/0014375 | A1 | * | 1/2011 | Holloway et al. | 427/256 |

* cited by examiner

*Primary Examiner* — Helene Klemanski

(57) ABSTRACT

The present invention relates to inkjet inks having improved compatibility with high resolution nozzle plate materials such that the inkjet inks resist clogging nozzles and flooding upon jetting. The inkjet ink includes one or more colorants, at least three co-solvents comprising about 18% to about 24% of the composition of the ink by weight, a penetrant, at least one wetting agent, and water.

18 Claims, No Drawings

INKJET INK HAVING IMPROVED HIGH RESOLUTION NOZZLE PLATE COMPATIBILITY

CROSS REFERENCE TO RELATED APPLICATIONS

Not applicable.

MICROFICHE APPENDIX

Not applicable.

GOVERNMENT RIGHTS IN PATENT

Not applicable.

BACKGROUND OF THE INVENTION

1. Field of the Invention

The present invention relates to inkjet inks, and, more particularly, to inkjet inks having improved jetting in use with high resolution nozzle plate materials.

2. Description of the Related Art

Thermal inkjet printing, to which this invention relates, is a commonly practiced form of printing. Thermal inkjet printing involves intense heating of an aqueous ink in a small amount in contact with a heating element so the ink is vaporized. The vaporized ink, including solids in the ink, is then expelled through a nozzle and subsequently jetted to an intended substrate, such as, for example, paper.

The composition of an inkjet ink is traditionally comprised of deionized water, a water-soluble organic solvent, and a colorant. The colorant may be a soluble dye or insoluble pigment. Traditionally, pigment based inks may have some disadvantages as compared to dye based inks as traditional pigment based inks tend to have slightly higher solids and viscosity which may pose to be more difficult for jetting through relatively smaller nozzle printhead designs. For example, due to the insolubility of pigments in water, polymeric dispersants and/or surfactants are typically added to improve the dispersibility of the pigment. The addition of a polymeric dispersant can increase the viscosity of an ink, and a viscous ink may be more difficult to jet in a printhead.

As inkjet resolution and speed increase, inks need to be more compatible with improved high resolution nozzle plate materials. For example, inks must be formulated to be jetted with high resolution nozzles without causing sag or bulge. Further, the inks should not dry prior to jetting, therein clogging the one or more nozzles. In addition, the inks should not flood under small nozzle diameters, those of about 15 um or less. While being able to conform to the above mentioned issues, the inks should also enable an individual to economically benefit by having a lower cost per page.

What is needed in the art is an economical inkjet ink having high compatibility with high resolution nozzle plate materials.

SUMMARY OF THE INVENTION

Exemplary embodiments of the present invention provide an inkjet ink comprised of one or more colorants, at least three co-solvents comprising about 18% to about 24% of the composition of the ink by weight, a penetrant, at least one wetting agent, and water.

Various other exemplary embodiments of the present invention include a method of printing using an inkjet ink. The method is comprised of the steps of positioning a print medium substantially adjacent to a printer having a print head retaining an inkjet ink, wherein the inkjet ink is comprised of one or more colorants, at least three co-solvents comprising about 18% to about 24% of the composition of the ink by weight, a penetrant, at least one wetting agent, and water. The inkjet ink is then jetting from the print head onto the print medium through nozzles having diameters of less than about 15 um.

DETAILED DESCRIPTION OF THE INVENTION

Inkjet inks have been known to have less than desirable compatibility with high resolution nozzle plate materials. In particular, known inkjet inks have been known to cause sag or bulge with high resolution nozzle plate materials. Similar inks may also clog nozzles by drying prior to jetting, as well as flood under small nozzle diameters.

It has been found that a color inkjet ink having three co-solvents, a penetrant, and a wetting agent has an increased compatibility with high resolution nozzle plate materials.

In various exemplary embodiments of the present invention, the inkjet ink is comprised of one or more colorants, at least three co-solvents comprising about 18% to about 24% of the composition of the ink by weight, a penetrant, at least one wetting agent, and water.

In exemplary embodiments, the inkjet ink may further be comprised of a biocide, such as, for example, PROXEL® GXL (available from Arch Chemicals, Inc. of Norwalk, Conn.).

In the various exemplary embodiments of the present invention, the one or more colorants of the inkjet ink are aqueous dyes comprising about 3.0% to about 6.0% of the composition of the ink by weight.

The one or more colorants may be selected from, for example, Fuji PRO-JET Cyan GLF (available from Fujifilm Imaging Colorants Limited); Nippon Magenta Dye JPD LM-1 Liquid (a magenta dye available from Nippon Kayaku Co, Ltd. of Tokyo, Japan); a magenta dye as described in U.S. Pat. No. 5,254,160 (a magenta dye available from Lexmark International of Lexington, Ky.) having the chemical structure:

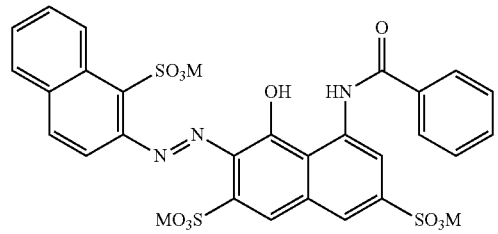

where M is H, Li, Na, or K; Nippon Yellow Dye JPD LM-NL Liquid (a yellow dye available from Nippon Kayaku Co, Ltd. of Tokyo, Japan); Acid Yellow 23, and combinations thereof.

The at least three co-solvents are selected from the group consisting of group consisting of 1,3-propanediol; 1,2-alkanediol; 1,5-pentanediol; triethylene glycol; and dipropylene glycol.

In exemplary embodiments, at least two of the three co-solvents are alkanediols and the third co-solvent is a glycol.

The penetrant is preferably about 1.0% to about 3.5% of the composition of the ink by weight. A exemplary penetrant is any 1,2-alkanediol such as, for example, 1-2-pentanediol, 1,2-hexanediol, and 1,2-octanediol.

It is preferred that the wetting agent be of about 0.5% to about 1.5% by weight of the inkjet ink. In a more preferred embodiment, the non-ionic silicone surfactant is about 0.75% by weight of the inkjet ink.

Exemplary wetting agents include polyoxyethylene dimethyl siloxanes, ZONYL® fluorosurfactants, and combinations thereof. A commercially available wetting agent is, for example, SILWET® L-7600 (polyalkylene oxide grafted polydimethylsiloxane from Momentive Performance).

The polymeric dispersant is preferably about 0.5% to about 2.0% by weight of the inkjet ink, and assists in stabilizing the carbon black pigment and buffering the pH of the inkjet ink.

An optional polymeric dispersant can be added to assist in stabilizing the compatibility with a carbon black pigment ink in a Cyan-Magenta-Yellow-Black (CMYK) inkset. When CMYK inks are printed in substantially close proximity to each other, each ink needs to be compatible and not destabilize adjacent inks In the present exemplary embodiments, the CMY dye inks may be printed along with a black pigmented ink without destabilizing any of the CMY dye inks or the black pigmented ink due to the presence of the polymeric dispersant in the CMY dye inks.

In exemplary embodiments of the present invention, the polymeric dispersant may be selected from dispersants set forth in, for example, any of U.S. Pat. Nos. 5,719,204; 5,994, 427; 6,063,834; 6,267,807; 6,896,724; and 6,984,701, all incorporated by reference.

One or more buffers may also be included in the inkjet ink composition. Exemplary embodiments of the one or more buffers include triethanolamine (TEA), N,N-bis(2-hydroxyethyl)tuarine or N,N-bis(2-hydroxyethyl)-2-aminoethane sulfonic acid (BES), or combinations thereof Several exemplary inkjet inks according to the present invention were formulated. Table 1 represents the compositions of each of the exemplary inkjet inks.

TABLE 1

Exemplary inkjet inks according to the present invention
(values are % by weight)

|  | Cyan Example | Magenta Example | Yellow Example |
| --- | --- | --- | --- |
| Fuji PRO-JET Cyan GLF | 4.0 | — | — |
| Nippon Magenta Dye JPD LM-1 Liquid | — | 2.0 | — |
| Magenta Dye of U.S. Pat. No. 5,254,160 | — | 2.0 | — |
| Nippon Yellow Dye JDP LM-NL Liquid | — | — | 3.0 |
| Acid Yellow 23 | — | — | 0.5 |
| 1,2-propanediol | 7.0 | — | — |
| 1,3-propanediol | 7.0 | 10.0 | 10.0 |
| 1,5-pentanediol | — | 5.0 | 5.0 |
| Triethylene glycol | 6.0 | — | 5.0 |
| Dipropylene glycol | — | 5.0 | — |
| 1,2-hexanediol | 2.5 | 2.5 | 2.5 |
| SILWET ® L7600 | 0.75 | 0.75 | 0.75 |
| Procel GXL | 0.10 | 0.10 | 0.10 |
| TEA | 0.40 | 0.40 | 0.40 |
| BES | 0.20 | 0.20 | 0.20 |
| D.I. Water | balance | Balance | balance |

Each of the above examples was evaluated by jetting the respective ink onto a print medium, such as, for example, paper, from an inkjet ink printer fitted with high resolution nozzle, that is, a nozzle having a diameter less than about 15 um. Each of the above exemplified inks showed improved jetting and associated compatibility with the high resolution nozzles as contrasted with the commercially available inkjet ink.

While this invention has been described with respect to at least one embodiment, the present invention can be her modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An inkjet ink comprising:
   one or more aqueous dyes;
   at least three co-solvents comprising about 18% to about 24% of the composition of the ink by weight;
   a penetrant;
   at least one wetting agent selected from the group consisting of polyoxyethylene dimethyl siloxanes, fluorosurfactants, and combinations thereof;
   a polymeric dispersant comprising about 0.5% to about 2.0% of the composition of the ink by weight; and
   water.

2. The inkjet ink according to claim 1, wherein the one or more aqueous dyes comprise about 3.0% to about 6.0% of the composition of the ink by weight.

3. The inkjet ink according to claim 1, wherein the penetrant is a 1,2-alkanediol.

4. The inkjet ink according to claim 1, wherein the penetrant comprises about 1.0% to about 3.5% of the composition of the ink by weight.

5. The inkjet ink according to claim 1, wherein the at least three co-solvents are selected from the group consisting of 1,3-propanediol; 1,2-alkanediol; 1,5-pentanediol; triethylene glycol; and dipropylene glycol.

6. The inkjet ink according to claim 1, wherein two of the at least three co-solvents are alkanediols and the third co-solvent is a glycol.

7. The inkjet ink according to claim 1, wherein the at least one wetting agent is about 0.5% to about 1.5% of the composition of the ink by weight.

8. The inkjet ink according to claim 1, further comprising one or more buffers selected from the group consisting of triethanolamine (TEA), N,N-bis(2-hydroxyethyl)tuarine or N,N-bis(2-hydroxyethyl)-2-aminoethane sulfonic acid (BES), and combinations thereof.

9. The inkjet ink according to claim 1, further comprising a biocide.

10. The inkjet ink according to claim 1, wherein the ink is jetted onto a print medium through nozzles having diameters of less than about 15 um.

11. A method of printing utilizing an inkjet ink, the method being comprised of the steps of:
   positioning a print medium substantially adjacent to a printer having a print head retaining an inkjet ink, wherein the inkjet ink is comprised of one or more aqueous dyes;
   at least three co-solvents comprising about 18% to about 24% of the composition of the ink by weight;
   a penetrant;
   at least one wetting agent selected from the group consisting of polyoxyethylene dimethyl siloxanes, fluorosurfactants, and combinations thereof
   a polymeric dispersant comprising about 0.5% to about 2.0% of the composition of the ink by weight; and
   water;
   jetting the inkjet ink from the print head onto the print medium through nozzles having diameters of less than about 15 um.

12. The method of printing utilizing an inkjet ink according to claim 11, wherein the one or more aqueous dyes comprise about 3.0% to about 6.0% of the composition of the ink by weight.

13. The method of printing utilizing an inkjet ink according to claim 11, wherein the penetrant is 1,2-hexanediol.

14. The method of printing utilizing an inkjet ink according to claim 11, wherein the penetrant comprises about 1.0% to about 3.5% of the composition of the ink by weight.

15. The method of printing utilizing an inkjet ink according to claim 11, wherein the at least three co-solvents are selected from the group consisting of 1,3-propanediol; 1,2-alkanediol; 1,5-pentanediol; triethylene glycol; and dipropylene glycol.

16. The method of printing utilizing an inkjet ink according to claim 11, wherein the at least one wetting agent is about 0.5% to about 1.5% of the composition of the ink by weight.

17. The method of printing utilizing an inkjet ink according to claim 11, further comprising one or more buffers selected from the group consisting of triethanolamine (TEA), N,N-bis(2-hydroxyethyl)tuarine or N,N-bis(2-hydroxyethyl)-2-aminoethane sulfonic acid (BES), and combinations thereof.

18. The method of printing utilizing an inkjet ink according to claim 11, further comprising a biocide.

* * * * *